(12) United States Patent
Nakai et al.

(10) Patent No.: US 8,676,461 B2
(45) Date of Patent: Mar. 18, 2014

(54) METHOD AND APPARATUS FOR CONTROLLING ACCELERATION OF A VEHICLE

(75) Inventors: Yasuhiro Nakai, Kariya (JP); Hajime Kumabe, Kariya (JP); Shotaro Fukuda, Oobu (JP); Satoshi Niwa, Nagoya (JP); Hiroyuki Kodama, Kariya (JP); Kazunori Kadowaki, Nagoya (JP); Shintaro Osaki, Nisshin (JP)

(73) Assignees: Denso Corporation, Kariya (JP); Advics Co., Ltd., Aichi-pref. (JP)

(*) Notice: Subject to any disclaimer, the term of this patent is extended or adjusted under 35 U.S.C. 154(b) by 1235 days.

(21) Appl. No.: 12/222,389

(22) Filed: Aug. 7, 2008

(65) Prior Publication Data

US 2009/0048751 A1   Feb. 19, 2009

(30) Foreign Application Priority Data

Aug. 10, 2007  (JP) .................. 2007-209244

(51) Int. Cl.
*B60T 7/12*  (2006.01)
*G05D 1/00*  (2006.01)
*G06F 7/00*  (2006.01)
*G06F 17/00*  (2006.01)
*B60T 8/32*  (2006.01)

(52) U.S. Cl.
USPC .................... 701/70; 701/78; 701/91; 701/93

(58) Field of Classification Search
USPC ........... 701/70, 71, 78, 82, 83, 84, 87, 91, 93, 701/94, 96, 98
See application file for complete search history.

(56) References Cited

U.S. PATENT DOCUMENTS

| 3,967,862 A | * | 7/1976 | Hunter et al. ................. 303/150 |
| 4,419,729 A | * | 12/1983 | Krieder ............................ 701/93 |
| 4,484,281 A | * | 11/1984 | Skarvada ......................... 701/71 |
| 4,576,417 A | * | 3/1986 | Dobner ........................... 303/15 |

(Continued)

FOREIGN PATENT DOCUMENTS

| DE | 196 16 732 A1 | 10/1997 |
| DE | 199 61 720 A1 | 8/2001 |

(Continued)

OTHER PUBLICATIONS

Office Action dated Sep. 7, 2009 for corresponding German patent application No. 10 2008 037 017.7-51 (English translation enclosed).

*Primary Examiner* — Khoi Tran
*Assistant Examiner* — Nicholas Kiswanto
(74) *Attorney, Agent, or Firm* — Posz Law Group, PLC

(57) ABSTRACT

A control apparatus controls acceleration of a vehicle provided with a motive power generation apparatus and brake apparatuses. For the control, the control apparatus comprises calculation and actuating blocks. The calculation block calculates torque to be requested, based on a difference between an actual value of the acceleration and a target value thereof and a gain for feedback controlling the actual value of the acceleration to the target value thereof. The gain is differentiated in value between in a first case in which the brake apparatuses are used for the feedback control and a second case in which the brake apparatuses are not used for the feedback control. The actuating block actuates the motive power generation apparatus and the brake apparatuses based on the calculated torque. The value of the gain in the first case is made larger than the value of the gain in the second case.

10 Claims, 12 Drawing Sheets

(56) References Cited

U.S. PATENT DOCUMENTS

| | | | |
|---|---|---|---|
| 4,825,367 A * | 4/1989 | Nagaoka et al. | 701/36 |
| 4,862,367 A * | 8/1989 | Tada et al. | 701/93 |
| 4,866,623 A * | 9/1989 | Ise et al. | 701/85 |
| 5,135,290 A * | 8/1992 | Cao | 303/150 |
| 5,216,609 A * | 6/1993 | Oo | 701/93 |
| 5,265,693 A * | 11/1993 | Rees et al. | 180/197 |
| 5,492,192 A * | 2/1996 | Brooks et al. | 180/165 |
| 5,653,517 A * | 8/1997 | Burckhardt et al. | 303/150 |
| 5,865,512 A * | 2/1999 | Meiser et al. | 303/139 |
| RE36,470 E * | 12/1999 | Woll et al. | 342/71 |
| 6,079,801 A * | 6/2000 | Zittlau | 303/150 |
| 6,161,907 A * | 12/2000 | Luckevich et al. | 303/158 |
| 6,542,806 B1 * | 4/2003 | Suhre et al. | 701/82 |
| 6,856,887 B2 * | 2/2005 | Akabori et al. | 701/96 |
| 7,035,727 B2 * | 4/2006 | De La Salle et al. | 701/93 |
| 7,249,807 B2 * | 7/2007 | Sakai | 303/112 |
| 7,455,143 B2 * | 11/2008 | Imura et al. | 180/242 |
| 7,894,971 B2 * | 2/2011 | Inoue et al. | 701/93 |
| 8,165,774 B2 * | 4/2012 | Wang et al. | 701/93 |
| 2002/0087247 A1 * | 7/2002 | Tanaka et al. | 701/70 |

FOREIGN PATENT DOCUMENTS

| | | |
|---|---|---|
| JP | A-2002-160616 | 6/2002 |
| JP | A-2004-025933 | 1/2004 |
| JP | A-2006-506270 | 2/2006 |

* cited by examiner

Twpt: REQUESTED POWER TRAIN TORQUE
Twbk: REQUESTED BRAKE TORQUE
fB: BRAKE FLAG $Tffreq = Fxreq \times r$ $Fx = 1/2 \times Cd \times \rho \times V^2 \times S + \mu Mg + Mg\sin\theta + M \times ara$
(AIR RESISTANCE)  (ROAD SURFACE RESISTANCE)  (GRAVITY)

Cd: COEFFICIENT
S: FRONT FACE PROJECTION AREA
$\mu$: FRICTION COEFFICIENT
$\theta$: ROAD SURFACE GRADIENT $\rho$: AIR DENSITY
V: ACTUAL VEHICLE SPEED
M: VEHICLE WEIGHT
r: RADIUS OF DRIVE WHEEL

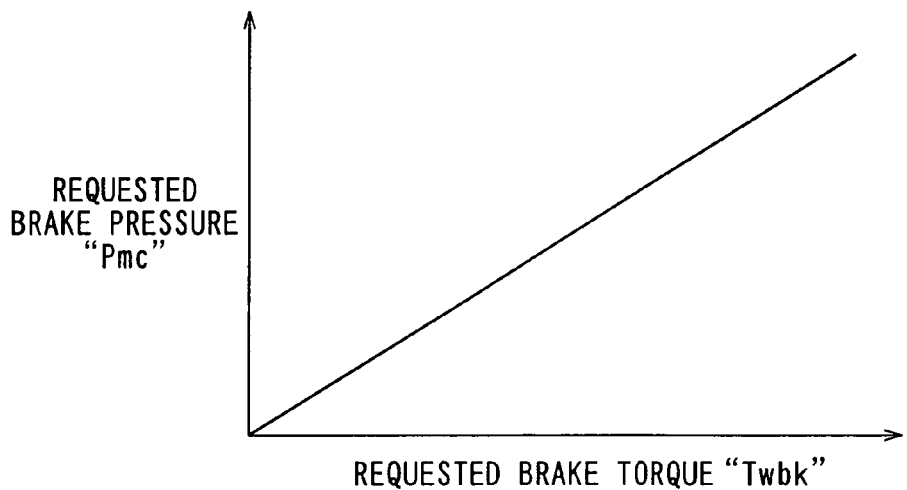
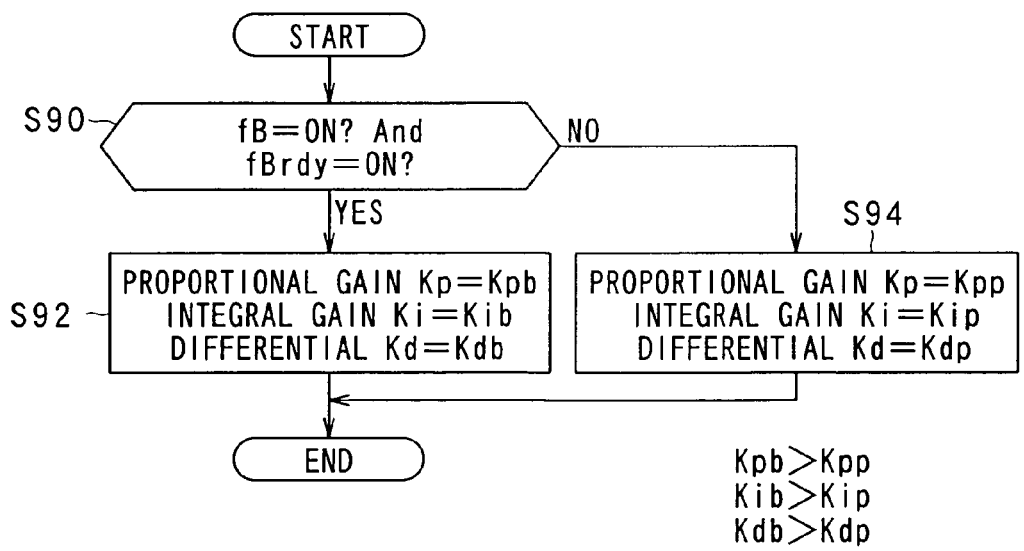

METHOD AND APPARATUS FOR CONTROLLING ACCELERATION OF A VEHICLE

CROSS-REFERENCE TO RELATED APPLICATION

This application is based on and claims the benefit of priority from earlier Japanese Patent Application No. 2007-209244 filed Aug. 10, 2007, the description of which is incorporated herein by reference.

BACKGROUND OF THE INVENTION

1. Technical Field of the Invention

The present invention relates to an apparatus and system for controlling vehicles, which is able to feedback-control an actual vehicle acceleration to a target acceleration.

2. Related Art

This type of control apparatus is disclosed, for example, in Japanese Patent Laid-Open No. 2006-506270. According to the technique disclosed in this literature, the actual acceleration and a target acceleration of the vehicle are inputted to an operating means for operating the vehicle-mounted engine and an operating means for operating the brake, in order to feedback-control the actual vehicle acceleration to the target acceleration. Under such control, requests from the applications for various automatic controls, such as cruise control and vehicle distance (intervehicle) control, can be expressed by the target acceleration. Thus, matching of these applications does not have to be conducted for the specification of every vehicle. Specifically, the only matching that should be conducted for every vehicle is for the processing function for setting the manipulated variable of each actuator which feedback-controls the actual acceleration to a target acceleration. Thus, common applications can be mounted on the control apparatuses of various vehicles.

In the control apparatus mentioned above, the actual acceleration and a target acceleration are inputted to each of the operating means for operating the vehicle-mounted engine and the operating means for operating the brake. This may involve cumbersome and complicated processes in calculating the manipulated variables of the engine and the brake and in matching these processes, or may make it difficult to properly calculate the manipulated variables. In other words, the processes and matching of the processes may be cumbersome and complicated, which are performed to obtain a proper value in the resultant force of the torque generated by the engine and the brake, by which value the actual acceleration can be controlled to a target acceleration.

Not necessarily limited to the control apparatuses mentioned above, it is true that, more or less, common difficulties can be found in such techniques as feedback-controlling the actual acceleration to a target acceleration by operating a motive power generation apparatus for generating driving force for vehicle and a braking system for generating braking force for vehicle. The common difficulties may include: a difficulty in easily and properly performing the processes of calculating the manipulated variable for each of such a motive power generation apparatus and a braking system and in matching these processes; and a difficulty in properly calculating the manipulated variables.

SUMMARY OF THE INVENTION

The present invention has been made in light of the above issues and has as its object to provide an apparatus and system for controlling vehicles, which is able to readily and properly perform the processes of calculating the manipulated variable for each of a motive power generation apparatus and a braking system, as well as matching of these processes, and is able to properly calculate the manipulated variables.

In order to achieve the object, there is provided a control apparatus for controlling acceleration (for example, longitudinal acceleration) of a vehicle provided with a motive power generation apparatus and brake apparatuses. The control apparatus comprises calculation means for calculating torque to be requested, based on a difference between an actual value of the acceleration and a target value thereof and a gain for feedback controlling the actual value of the acceleration to the target value thereof, wherein the gain for the feedback control is differentiated in value between in a first case in which the brake apparatuses are used for the feedback control and a second case in which the brake apparatuses are not used for the feedback control; and actuating means for actuating the motive power generation apparatus and the brake apparatuses based on the calculated torque. For example, the calculation means comprises means for determining whether or not the brake apparatuses are used for the feedback control; and means for differentiating the value of the gain between the first and second cases. It is preferred that the control apparatus further comprises distribution means for distributing the torque to be requested into torque requested by the motive power generation apparatus and torque requested by the brake apparatuses, wherein the actuating means is configured to actuate the motive power generation apparatus and the brake apparatuses based on the distributed torques, and the value of the gain in the first case is made larger than the value of the gain in the second case.

In this configuration, a sole common requested torque is calculated for the vehicle-mounted motive power generation apparatus and the vehicle-mounted brake apparatuses to feedback-control the actual acceleration to a target acceleration. Then, the requested torque is distributed between the motive power generation apparatus and the brake apparatuses. Thus, in controlling the actual acceleration to a target acceleration, a proper manipulated variable can be readily set for each of the motive power generation apparatus and the brake apparatuses.

However, in general, response characteristics for the change of the requested torque may be different between the motive power generation apparatus and the brake apparatuses. Thus, if the gains in the feedback control are common between the time when the brake apparatuses are used and the time when not used, it may be difficult to perform optimal control. In this regard, by switching gains in the feedback control between the time when the brake apparatuses is used and the time when not used, the feedback control can be performed with the gains suitable for the actuator used for generating the requested torque.

The value of the gain in the first case may be made larger than the value of the gain in the second case. In this configuration, suitable gains can be set for the time when the brake apparatuses is used and for the time when not used, in the case where, for example, the responsiveness of the motive power generation apparatus is lower than that of the brake apparatuses.

It is preferred that the control apparatus further comprises distribution means for distributing the torque to be requested into torque requested by the motive power generation apparatus and torque requested by the brake apparatuses, wherein the actuating means is configured to actuate the motive power generation apparatus and the brake apparatuses based on the distributed torques, and the value of the gain in the first case is made larger than the value of the gain in the second case. By way of example, the motive power generation apparatus comprises an internal combustion engine and a transmission apparatus coupled to the engine, which are mounted on the vehicle.

Such a motive power generation apparatus having an internal combustion engine and a transmission tends to have responsiveness lower than that of the brake apparatuses. In order to stabilize the control, the gains should preferably be smaller as the responsiveness becomes lower. Also, the brake apparatuses is usually used during a transient travel time period, while the motive power generation apparatus is usually used during both transient and steady travel time periods. Thus, when the brake apparatuses are not in use, they tend to be preferred that a large manipulated variable is ensured not to be calculated for disturbance. The present invention focuses on this point and allows large gains in the feedback control for the time when the brake apparatuses are used. In this way, suitable gains can be set for both of the time when the brake apparatuses is used and for the time when not used.

The brake apparatuses may be fluid-driven brake apparatuses that generate a braking force based on pressure of operating fluid contained therein. In this case, it is preferred that the control apparatus comprises estimating means for estimating a predetermined condition where, when the brake apparatuses are used, the braking force generated by the brake apparatuses is insufficient from a target value thereof, and reduction means for reducing the gain for the feedback control from the value of the gain preset in the first case, when the estimating means estimates the predetermined condition.

Such fluid-driven brake apparatuses tend to have low responsiveness at the beginning of effecting the braking force. On the other hand, from the viewpoint of stabilizing the control, gains are preferred to be set according to the responsiveness. Thus, when the brake apparatuses begin to effect the braking force, no proper gains may be obtained from the use of the gains obtained after having been enabled to effect a sufficient braking force. In this regard, under the circumstances where the braking force is estimated yet to be sufficient, the above invention can reduce the gains in the feedback control, comparing with those for the time when the brake apparatuses are used. In this way, the feedback control can be performed with the gains suitable for such circumstances.

When the fluid-driven brake apparatuses are used, the control apparatus may comprise estimating means for estimating a predetermined condition where i) the distributed requested torque for the brake apparatuses is not zero so that there is still a demand for the braking force and ii), when the brake apparatuses are used, the braking force generated by the brake apparatuses is insufficient from a target value thereof, and delay means for delaying the differentiation of the gain.

Under the circumstances where the braking force is estimated to be not yet sufficient, the above invention can reduce the gains in the feedback control, comparing with those for the time when brake apparatuses is used, by permitting the switching of the gains to be delayed in the feedback control. Thus, when the braking force is insufficient after the start of use of the brake apparatuses, the feedback control can be performed with the gains for the time when the brake apparatuses is not used, that is, the gains smaller than those for the time when the brake apparatuses is used. In addition, under the conditions where the braking force is insufficient, the feedback control can be performed with proper gains.

The calculation means may be configured to calculate the torque to be requested, based on an accumulated value of a value indicative of the difference between the actual value of the acceleration to the target value thereof, and the delay means is configured to delay the differentiation of the gain using the accumulated value of the value indicative of the difference.

When the braking force is insufficient, the absolute value of the accumulated value tends to be large. Thus, there may be a case where gains are large in calculating the requested torque based on the degree of deviation using the accumulated value. In such a case, in particular, the absolute value of the requested torque calculated based on the accumulated value may be excessively large. In this regard, in the above invention, the gains are switched with a delay in calculating the requested torque based on the degree of deviation using the accumulated value, whereby the above problem can be favorably mitigated.

When the fluid-driven brake apparatuses are used, the control apparatus may comprise estimation means for estimating that a request for using the braking force of the brake apparatuses arises; and increase means for previously increasing the pressure of the operating fluid in the brake apparatuses.

It takes time for such fluid-driven brake apparatuses to sufficiently effect the braking force. Accordingly, the braking force may be insufficient immediately after the start of use of the brake apparatuses. In this regard, the above configuration permits the pressure of the fluid to be increased in advance, if a request for using the braking force is estimated to be issued. In this way, a sufficient braking force can be ensured immediately after the start of use of the braking force.

It is still preferred that the control apparatus comprises acceleration calculating means for calculating acceleration to be requested by the vehicle at first intervals, and target acceleration calculating means for calculating the value of the target acceleration by gradually changing the target acceleration to the calculated acceleration to be requested, at second intervals shorter than the first intervals, wherein the estimation means is configured to use the requested acceleration in the estimation.

In the above invention, the requested acceleration serves as a parameter for determining the change of the target acceleration during the calculation cycle. Thus, by using the requested acceleration, it is possible to estimate in advance whether or not such conditions will be brought about as where the brake apparatuses is desired to be used according to the requested torque calculated based on the target acceleration.

As another aspect, the present invention provides a control apparatus for controlling acceleration of a vehicle, comprising: a motive power generation apparatus, mounted on the vehicle; brake apparatuses mounted on the vehicle; calculation means for calculating torque to be requested, based on a difference between an actual value of the acceleration and a target value thereof and a gain for feedback controlling the actual value of the acceleration to the target value thereof, wherein the gain for the feedback control is differentiated in value between in a first case in which the brake apparatuses are used for the feedback control and a second case in which the brake apparatuses are not used for the feedback control; and actuating means for actuating the motive power generation apparatus and the brake apparatuses based on the calculated torque.

BRIEF DESCRIPTION OF THE DRAWINGS

In the accompanying drawings:

FIG. 12 is a diagram illustrating a relationship between requested brake torque and requested brake pressure, according to the first embodiment;

FIG. 13 is a flow diagram illustrating a procedure for switching gains in the feedback control, according to the first embodiment;

DETAILED DESCRIPTION OF THE PREFERRED EMBODIMENTS

First Embodiment

With reference to the accompanying drawings, hereinafter will be described a vehicle control apparatus according to a first embodiment of the present invention.

Figure 1:
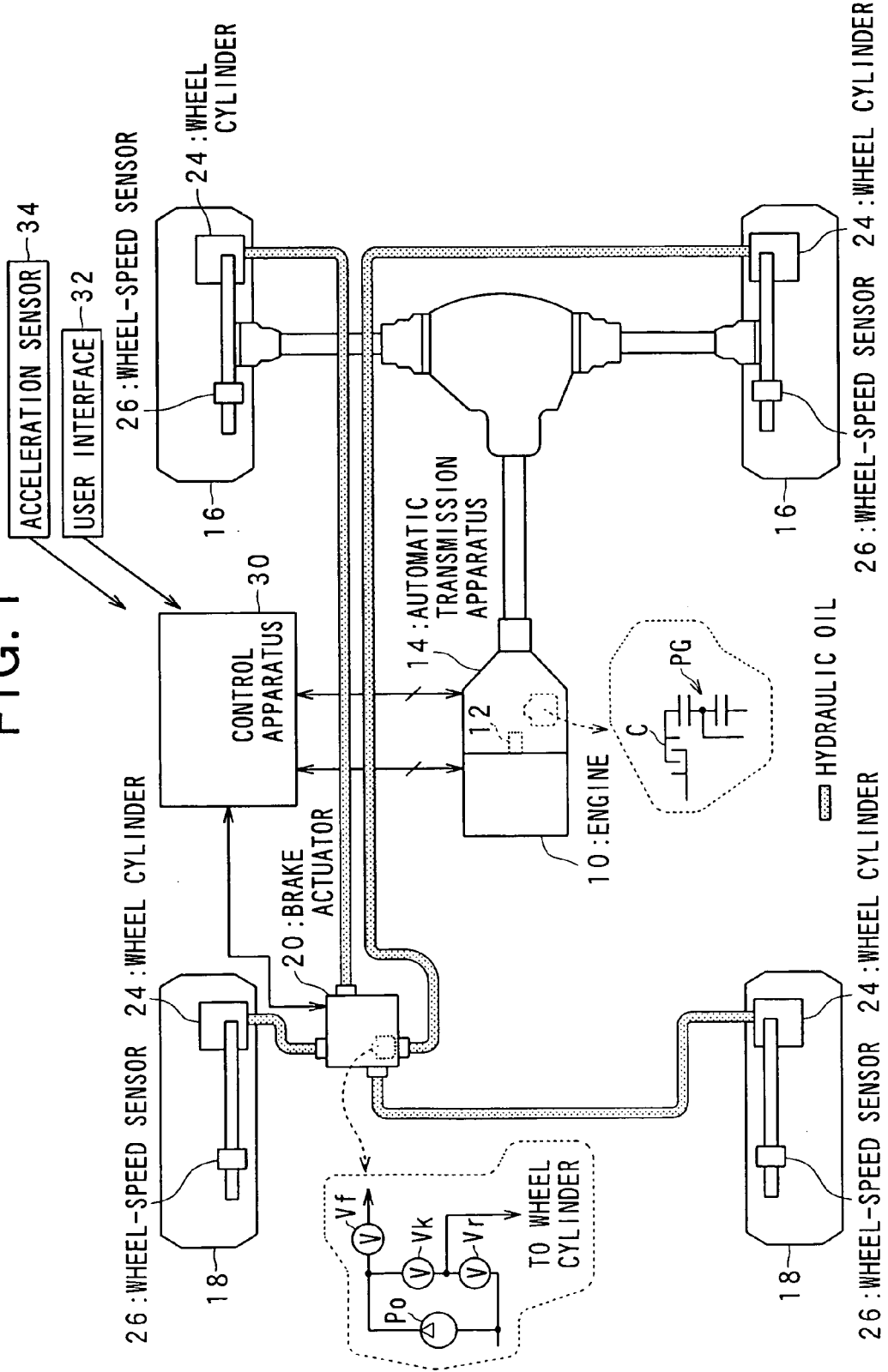
FIG. 1 illustrates a general configuration of a vehicle control system, according to a first embodiment of the present invention.

FIG. 1 illustrates a general configuration of the vehicle control system, according to the present embodiment.

An engine 10, a gasoline powered internal combustion engine, includes a crank shaft 12 to which an automatic transmission apparatus 14 is connected. The automatic transmission apparatus 14 is provided with a torque converter and a planetary gear automatic transmission. In the planetary gear automatic transmission, any of a plurality of power transmission paths formed by planetary gears PG is selected, depending on the engagement conditions of a clutch C and a brake (not shown) as friction elements. The planetary gear automatic transmission is adapted to realize a gear ratio according to the selected power transmission path. The torque of the crank shaft 12 of the engine 10 is changed by the automatic transmission apparatus 14 and then transmitted to drive wheels 16.

The drive wheels 16 and idler wheels 18 can be imparted with braking force by a hydraulic brake actuator 20. In addition to an electrical pump Po, the brake actuator 20 is provided with a retention valve Vk and a decompression valve Vr, for each of the wheels (the drive wheels 16 and the idler wheels 18). The retention valve Vk retains the pressure of the hydraulic oil supplied to a wheel cylinder 24, and the decompression valve Vr reduces the pressure of the hydraulic oil in the wheel cylinder 24. The brake actuator 20 is also provided with a linear relief valve Vf for causing pressure difference between the side of a master cylinder, not shown, and the side of the wheel cylinder 24. The discharge side of the pump Po is connected to the suction side of the pump Po via the retention valve Vk and the decompression valve Vr. The hydraulic oil is flowed in/out between the connected portion of the retention valve Vk and the decompression valve Vr, and the wheel cylinder 24.

The operation of the linear relief valve Vf, the retention valve Vk and the decompression valve Vr can realize automatic brake control which is performed independently of the user's brake operation which realizes anti-brake lock braking control (ABS), traction control and skid prevention control, for example. Specifically, in retaining braking force, the pressure of the hydraulic oil in the wheel cylinder 24 is retained by closing both of the retention valve Vk and the decompression valve Vr. In decreasing braking force, the pressure in the wheel cylinder 24 is lowered by closing the retention valve Vk and opening the decompression valve Vr.

In increasing braking force, the pressure of the hydraulic oil supplied to the wheel cylinder 24 is raised by opening the linear relief valve Vf and the retention valve Vk and closing the decompression valve Vr. In this case, the pressure in the wheel cylinder 24 is controlled by controlling the current supply for the linear relief valve Vf. Specifically, the linear relief valve Vf is adapted to cause pressure difference between the side of the master cylinder and the side of the wheel cylinder 24, as mentioned above, in proportion to the amount of current supply. Accordingly, the pressure difference can be adjusted according to the amount of current supply, which is eventually led to the pressure control in the wheel cylinder 24. In particular, in the case where the user's brake operation for realizing skid prevention control, for example, is not performed, the pump Po is actuated to produce a pressure to be applied into the wheel cylinder 24, while at the same time, the pressure is adjusted according to the amount of current supply to the linear relief valve Vf.

In this regard, hysteresis may be caused to the pressure difference between the side of the master cylinder and the side of the wheel cylinder 24, accompanying the increase and decrease in the amount of current supply mentioned above. In order to reduce the hysteresis, the operation of current supply to the linear relief valve Vf is carried out based on time-ratio control for adjusting time ratio between logic "H" and logic "L" of applied voltage (the ratio of logic "H" to the time periods of logic "H" and logic "L": duty). The frequency (dither frequency) of the time-ratio control ranges from about "1 kHz" to "several kHz's", for example.

Each of the drive wheels 16 and the idler wheels 18 is provided with a wheel-speed sensor 26 for detecting the rotational speed of the wheel.

A control apparatus 30, which is for example provided with a CPU (central processing unit) and memories to compose a computer system for the control, controls the travel conditions of the vehicle. Specifically, the control apparatus 30 retrieves detection values of various sensors for detecting the operating conditions of the engine 10 and the automatic transmission apparatus 14, as well as the output signals of the wheel-speed sensors 26, a user interface 32 and an acceleration sensor 34 to control traveling of the vehicle based on these values and signals. The user interface 32 includes an automatic travel switch through which the user can request automatic travel of the vehicle, and an accelerator operating member through which the user can request torque increase to the engine 10. The accelerator sensor 34 is adapted to detect acceleration (for example, anteroposterior acceleration caused in the front-rear (or back and forth) direction of the vehicle) based on the force applied to the sensor per se. A pendulum type or strain-gauge type sensor, for example, can serve as the accelerator sensor 34.

When a request for automatic travel is inputted by the user through the user interface 32, the control apparatus 30 adjusts the actual speed (actual acceleration) of the vehicle to a target value (target acceleration). The detailed are provided below.

Figure 2:
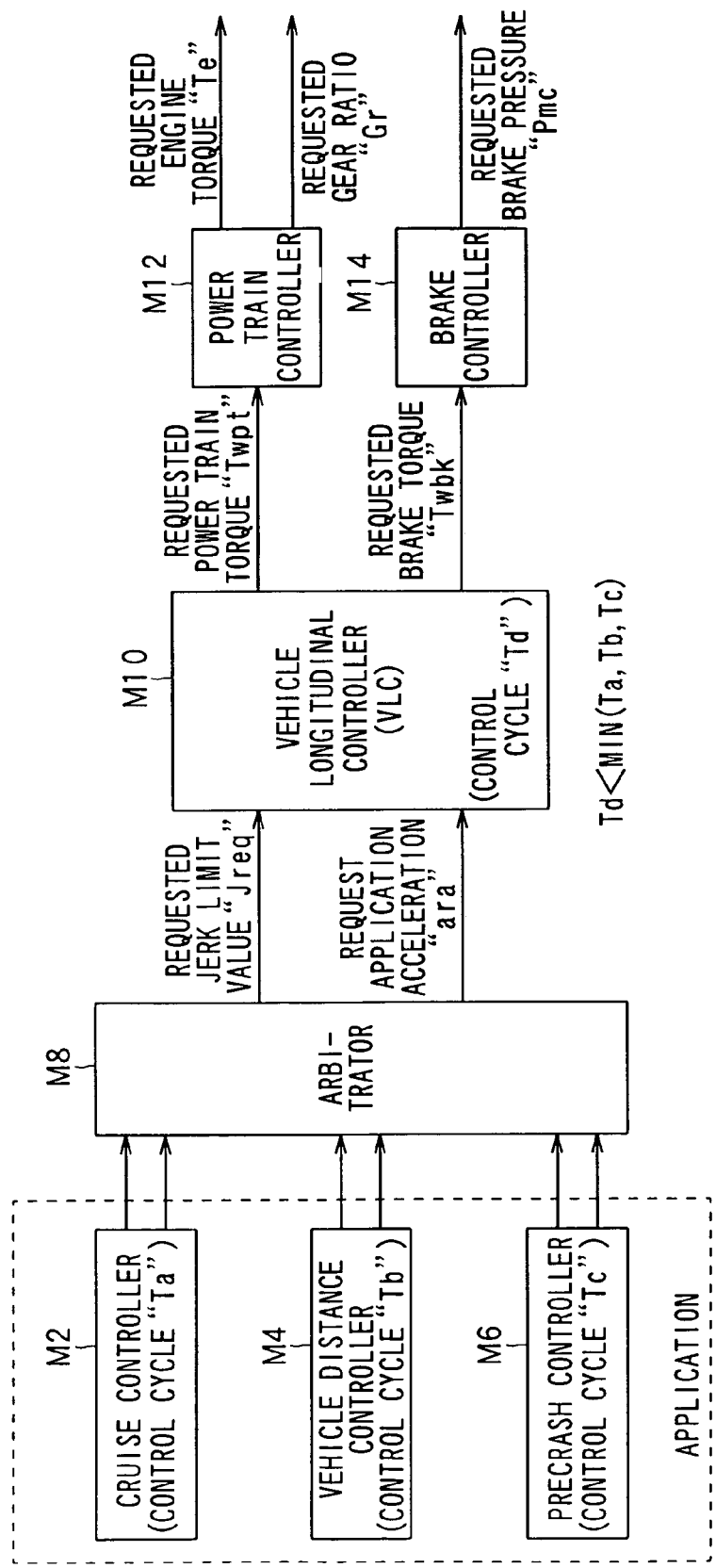
FIG. 2 is a block diagram illustrating the processes concerning automatic travel control, according to the first embodiment.

FIG. 2 shows the processes associated, in particular, with the automatic travel control, among the processes performed by the control apparatus 30.

FIG. 2 exemplifies such automatic travel applications as a cruise controller M2, a vehicle distance controller M4 and a Precrash controller M6. The cruise controller M2 controls the travel speed of the vehicle to be kept at a certain level. The vehicle distance controller M4 controls the distance between the vehicle and a preceding vehicle to a predetermined distance. The Precrash controller M6 controls the shock of possible collision with the preceding vehicle to be mitigated. The cruise controller M2, the vehicle distance controller M4 and the Precrash controller M6 all output a requested value of acceleration (requested acceleration) and a requested limit value of jerk that will be described later.

An arbitrator M8 outputs a finally requested jerk limit value "Jreq" and a requested acceleration (application acceleration "ara") based on the outputs from the cruise controller M2, the vehicle distance controller M4 and the Precrash controller M6.

A vehicle longitudinal controller (VLC) M10 outputs: a requested power-train torque "Twpt" which is a torque requested for the power train made up of the engine 10 and the automatic transmission apparatus 14; and a requested brake torque "Twbk" which is a torque requested for the brake actuator 20. A control cycle "Td" of the vehicle longitudinal controller M10 is different from a control cycle "Ta" of the cruise controller M2, a control cycle "Tb" of the vehicle distance controller M4 and a control cycle "Tc" of the Precrash controller M6. Specifically, the cycle "Td" of the vehicle longitudinal controller M10 is set shorter than the cycle "Ta" of the cruise controller M2, the cycle "Tb" of the vehicle distance controller M4 and the cycle "Tc" of the precrash controller M6. This is because the applications are adapted to calculate requested acceleration based on various detection values obtained from detecting means, such as one which detects a preceding vehicle by radar, and thus because the detection cycles of these detecting means tend to be longer than the detection cycles of actual vehicle speed and actual acceleration.

A power train controller M12 outputs a requested value of torque for the engine 10 (requested engine torque "Te"), and a requested value of gear ratio for the automatic transmission apparatus 14 (requested gear ratio "Gr"), in response to the requested power train torque "Twpt". A brake controller M14 outputs a requested value of hydraulic oil pressure for the brake actuator 20 (requested brake pressure "Pmc"), in response to the requested brake torque "Twbk". It should be appreciated that the requested brake pressure "Pmc" is a manipulated variable of the brake actuator 20 which adjusts, through the hydraulic oil pressure, the braking force in each of the drive wheels 16 and the idler wheels 18.

All the controllers and arbitrator are, for example, functionally realized by the computer system.

Figure 3:
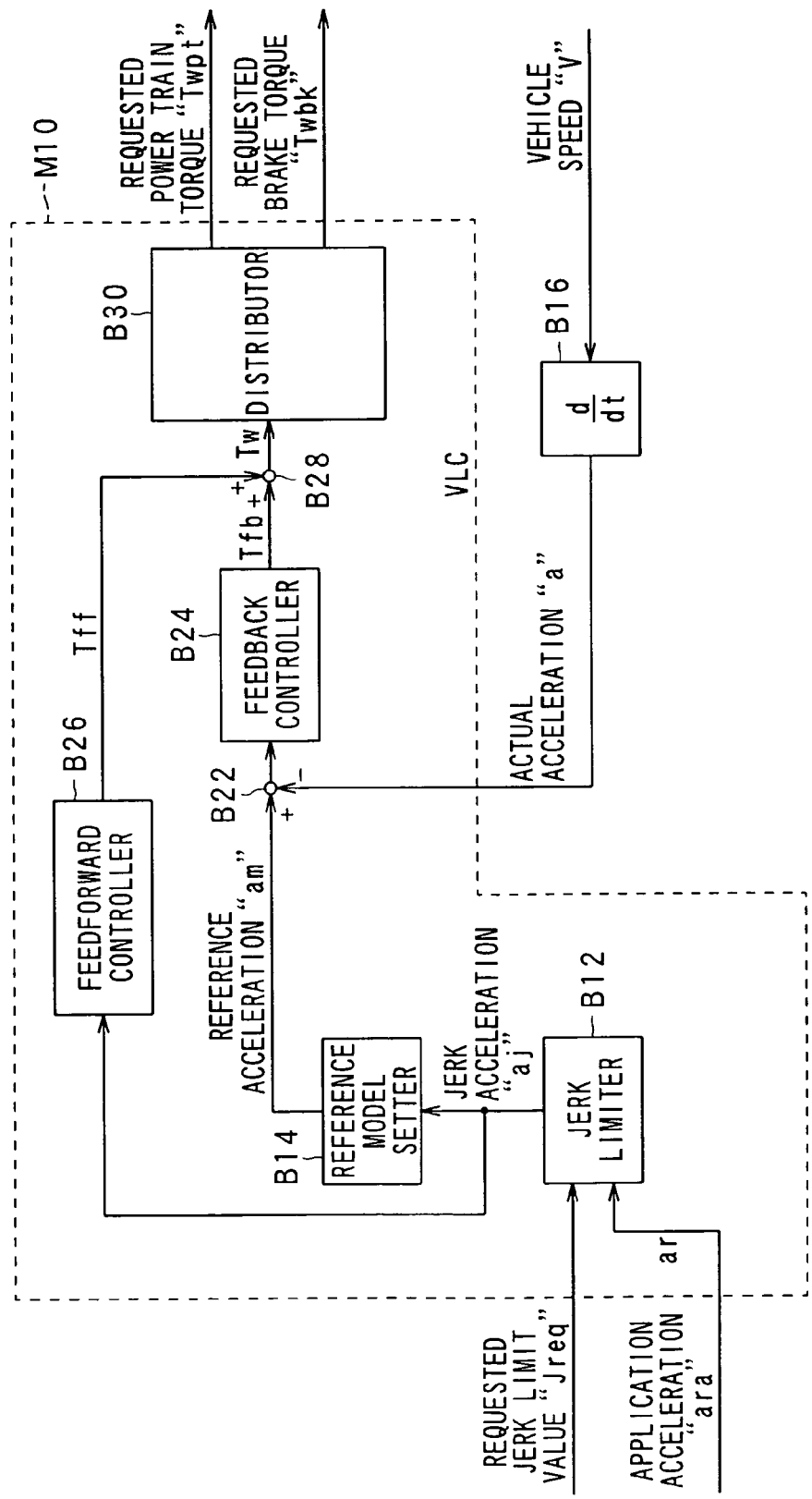
FIG. 3 is a block diagram illustrating in detail the processes performed by a vehicle longitudinal controller, according to the first embodiment.

FIG. 3 shows in detail the processes performed by the vehicle longitudinal controller M10.

In the vehicle longitudinal controller M10, the application acceleration "ara" outputted from the arbitrator M8 is outputted as a requested acceleration "ar" to the jerk limiter B12. The jerk limiter B12 performs a process by which the amount of change in the requested value of the acceleration in one control cycle of the vehicle longitudinal controller M10 can be limited to a value equal to or smaller than the requested jerk limit value "Jreq".

Figure 4:
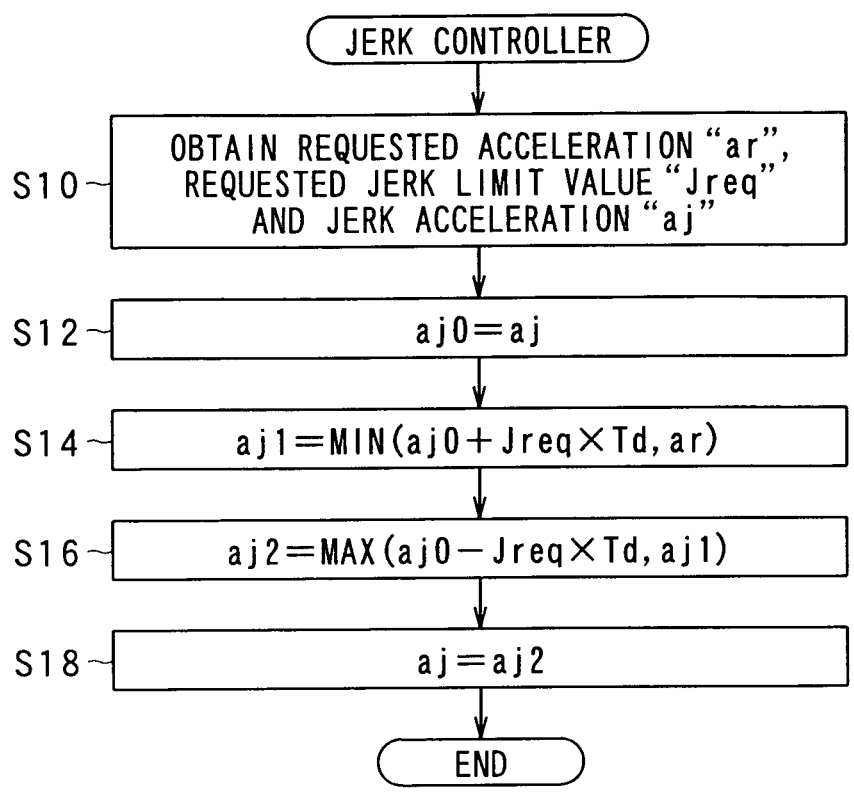
FIG. 4 is a flow diagram illustrating a procedure performed by a jerk limiting reference model setter of the vehicle longitudinal controller.

FIG. 4 shows a series of processes performed by the jerk limiter B12. First, at step S10, the jerk limiter B12 obtains the requested acceleration "ar", the requested jerk limit value "Jreq" and a jerk acceleration "aj" that is the present output of the jerk limiter B12. At the subsequent step S12, the jerk acceleration "aj" is set as a previous value "aj0". At steps S14 and S16, the change in the requested acceleration "ar" is limited so that the difference from the previous value "aj0" will be equal to or less than the jerk limit value "Jreq". That is, at step S16, a value "aj1" is calculated, which value corresponds to a value obtained by multiplying the jerk limit value "Jreq" with the control cycle "Td" and adding the resultant value to the previous value "aj0", or corresponds to the requested acceleration "ar", whichever is smaller. At the subsequent step S16, a value "aj2" is calculated, which value corresponds to a value obtained by multiplying the jerk limit value "Jreq" with the control cycle "Td" and subtracting resultant value from the previous value "aj0", or corresponds to the smaller value "aj1" mentioned above, whichever is larger. At step S18, the larger value "aj2" is set as the jerk acceleration "aj".

Thus, in one control cycle of the applications, the jerk acceleration "aj" is shifted stepwise to the requested acceleration "ar" at every control cycle "Td" of the vehicle longitudinal controller M10, with the jerk limit value "Jreq" as being the maximum amount of change.

In the vehicle longitudinal controller M10, the vehicle acceleration is controlled to the jerk acceleration "aj" by two-degree freedom control. In particular, the actual acceleration is feedback-controlled to the jerk acceleration "aj", and at the same time, the actual acceleration is feedforward controlled to the jerk acceleration "aj". An explanation will be given first on the feedback control.

<Feedback Control>

Figure 5A:
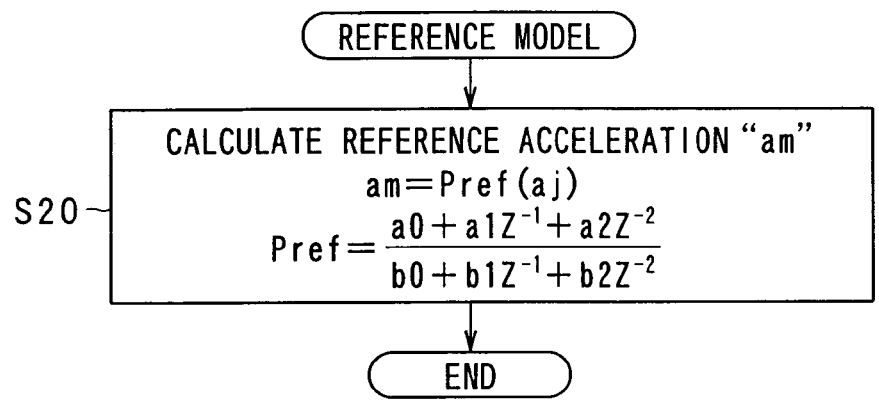
FIG. 5A is a flow diagram illustrating a procedure performed by a reference model setter of the vehicle longitudinal controller.
Figure 5B:
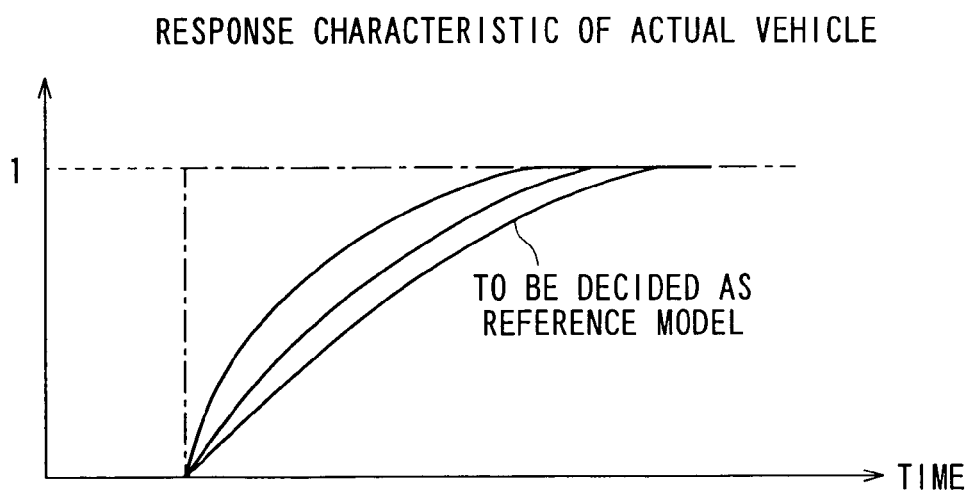
FIG. 5B is a diagram illustrating response characteristics of actual vehicle.

A reference model setter B14 shown in FIG. 3 outputs a reference acceleration "am" by converting the jerk acceleration "aj" in terms of a reference model. The reference model is to determine a behavior of the target acceleration in a transient travel time period of the vehicle, during which the jerk acceleration "aj" changes. The process performed by the reference model setter B14 is shown in FIG. 5A as step S20. Specifically, the reference model is a primary delay model, and thus the jerk acceleration "aj" is converted in terms of the primary delay model. As shown in FIG. 5B, the primary delay model is set based on the response characteristics at the time when the response delay of the actual acceleration (solid lines) is maximized, in a step change of the target acceleration (dash-dot line). More specifically, the response characteristics are supposed to change according to the operating conditions of the vehicle, such as the rotational speed of the engine 10. Thus, in the changing operating conditions, the characteristics at the time when the response delay is maximized are used as the base for the primary delay model.

A differential operator B16 shown in FIG. 3 performs an operation by differentiating an actual vehicle speed "V" with respect to time. The actual vehicle speed "V" is based on the detection value derived from the wheel-speed sensor 26 provided at each of the drive wheels 16 and the idler wheels 18. In particular, the actual vehicle speed "V" may, for example, be an average of the detection values of the four wheel-speed sensors 26, or a maximum value of the detection values.

A difference calculator B22 calculates a difference (difference "err") between an actual acceleration "a" outputted from the differential operator B16 and the reference acceleration "am" outputted from the reference model setter B14.

Figure 6:
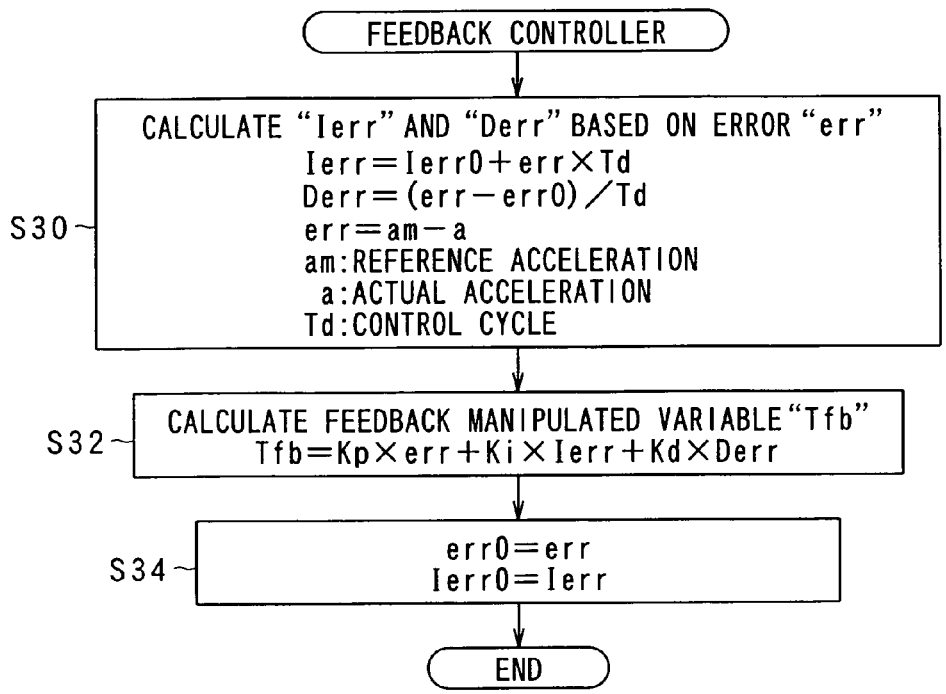
FIG. 6 is a flow diagram illustrating a procedure performed by a feedback controller of the vehicle longitudinal controller.

A feedback controller B24 is adapted to feed back the actual acceleration "a" to the reference acceleration "am". In the present embodiment, in particular, the feedback controller B24 performs proportional-integral-differential (PID) control. FIG. 6 shows a series of processes performed by the feedback controller B24.

First, at step S30, an integral value "Ierr" and a differential value "Derr" are calculated based on the difference "err". Particularly, the current integral value "Ierr" is calculated by multiplying the current difference "err" with the control cycle "Td" and adding the resultant to a previous integral value "Ierr0". Also, the differential value "Derr" is calculated by subtracting a previous difference "err0" from the current difference "err" and dividing the resultant by the control cycle "Td". At the subsequent step S32, a feedback manipulated variable "Tfb" is calculated. Particularly, the feedback manipulated variable "Tfb" is calculated by summing up: a value obtained by multiplying the difference "err" with a proportional gain "Kp"; a value obtained by multiplying the integral value "Ierr" with an integral gain "Ki"; and a value obtained by multiplying the differential value "Derr" with a differential gain "Kd". The proportional gain "Kp", the integral gain "Ki" and the differential gain "Kd" are for converting the integral value "Ierr" and the differential value "Derr" into the requested torque. In other words, the feedback manipulated variable "Tfb" represents a torque requested for rendering the actual acceleration "a" to be the reference acceleration "am". When the process pf step S32 is completed, the difference "err" is stored, at step S34, as the previous difference "err0" and the integral value "Ierr" is stored as the previous integral value "Ierr0".

<Feedforward Control>

Hereinafter is explained the feedforward control in the two-degree freedom control mentioned above.

Figure 7:
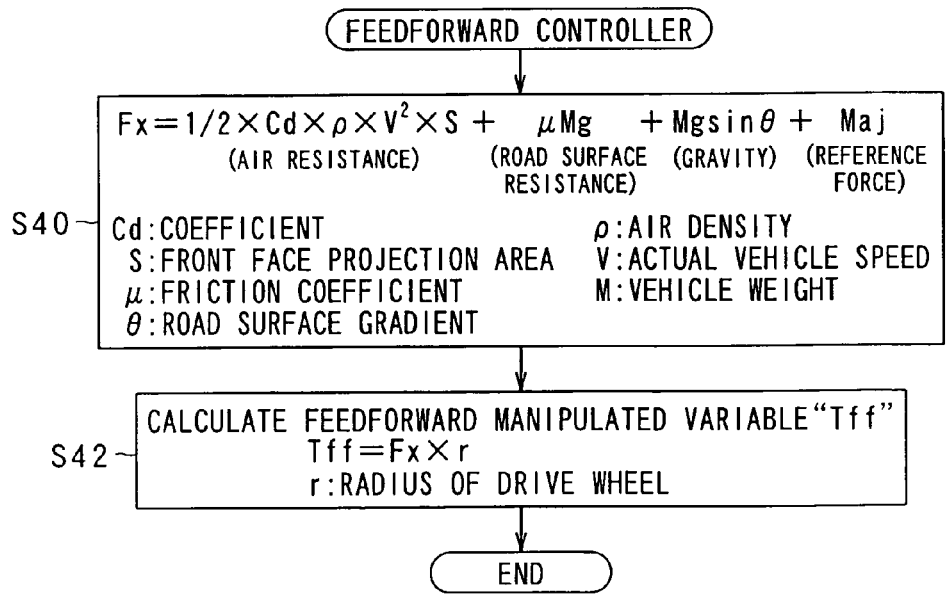
FIG. 7 is a flow diagram illustrating a procedure performed by a feedforward controller of the vehicle longitudinal controller.

A feedforward controller B26 shown in FIG. 3 performs the feedforward control to achieve the jerk acceleration "aj". FIG. 7 shows a series of processes performed by the feedforward controller 526.

First, at step S40, a force "Fx" Is calculated, which should be added to the travel direction of the vehicle to achieve the jerk acceleration "aj". At this step, the force "Fx" is calculated as a sum of air resistance, road surface resistance, gravity and reference force. The reference force can be obtained by multiplying the jerk acceleration "aj" with a vehicle weight "M". The reference force is necessary for having the vehicle traveled at the jerk acceleration "aj" in the state where no resistance is added in traveling the vehicle. The air resistance is a force of air, which is added in the direction reverse of the travel direction of the vehicle. In the present embodiment, the air resistance is calculated by multiplying the square of the actual vehicle speed "V" with an air density "ρ", a coefficient "Cd" and a projection area "S" of the vehicle front, followed by multiplication with "½". The road surface resistance is a resistance caused by the friction between the road surface and the drive wheels 16 and the idler wheels 18, and is calculated by the multiplication of a friction coefficient "μ", the vehicle weight "M" and a gravity acceleration "g". The term "gravity" refers to a gravity which is applied to the travel direction of the vehicle when the road surface is inclined. This "gravity" can be expressed by "Mg sin θ" using a road surface gradient "θ". It should be appreciated that the road surface gradient "θ" is calculated based on the actual vehicle speed "V" and the detection value of the acceleration sensor 34 mentioned above.

At the subsequent step S42, a feedforward manipulated variable "Tff" is calculated by multiplying the force "Fx" with a radius "r" of the drive wheel 16. The feedforward manipulated variable "Tff" is the torque requested for having the vehicle traveled at the jerk acceleration "aj".

An axle torque calculator B28 shown in FIG. 3 calculates a requested axle torque "Tw" by adding the feedback manipulated variable "Tfb" to the feedforward manipulated variable "Tff".

Figure 8:
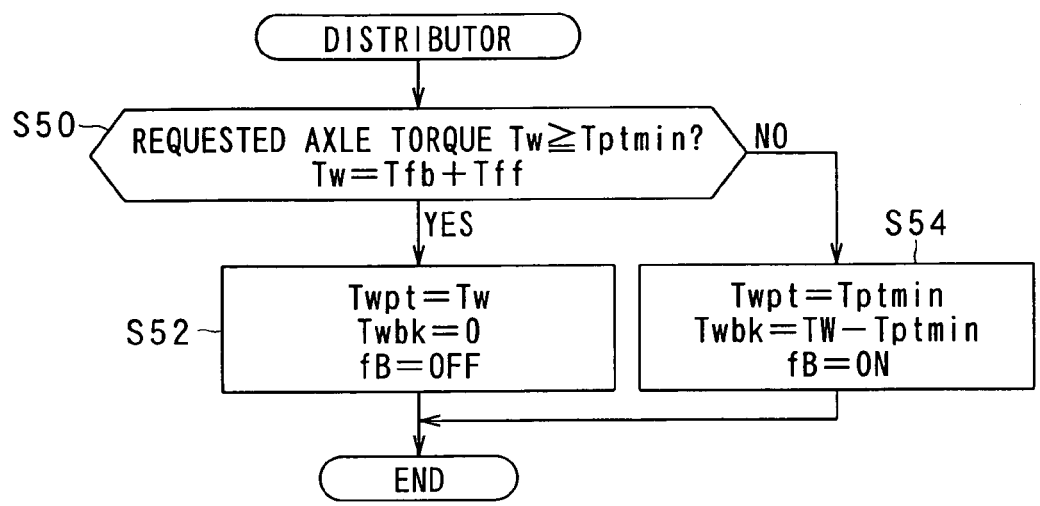
FIG. 8 is a flow diagram illustrating a procedure performed by a distributor of the vehicle longitudinal controller.

A distributor B30 divides (distributes) the requested axle torque "Tw" into the requested power train torque "Twpt" and the requested brake torque "Twbk". FIG. 8 shows a series of processes performed by the distributor B30.

First, at step S50, it is determined whether or not the requested axle torque "Tw" is equal to or more than a minimal torque "Tptmin". This process determines whether or not the requested axle torque "Tw" can be produced only by the power train. In this regard, the minimal torque "Tptmin" here is the minimal torque that is available by the engine 10 and the automatic transmission apparatus 14. If the requested axle torque "Tw" is equal to or more than the minimal torque "Tptmin", the requested axle torque "Tw" is determined as can be realized only by the power train, and control proceeds to step S52. At step S52, the requested power train torque "Twpt" is set as the requested axle torque "Tw", while the requested brake torque "Twbk" is set to zero. On the other hand, if a negative determination is made at step S50, the requested axle torque "Tw" is determined as cannot be produced only by the power train, and control proceeds to step S54. At step S54, the requested power train torque "Twpt" is set as the minimal torque "Tptmin", and the requested brake torque "Twbk" is set as a value obtained by subtracting the minimal torque "Tptmin" from the requested axle torque "Tw".

According to the series of processes described above, the actual acceleration of the vehicle can be controlled to the jerk acceleration "aj". In the case where the jerk acceleration "aj" changes, the actual acceleration can be properly controlled to the reference acceleration "am". In other words, in the case where the jerk acceleration "aj" changes and where the acceleration of the vehicle is feedforward controlled to the jerk acceleration "aj", response delay is caused in the actual acceleration with respect to the change in the jerk acceleration "aj", due to the response delay of the vehicle. However, the actual acceleration estimated from the response delay can be approximated to the reference acceleration "am". In addition, owing to the feedback control, the actual acceleration can be controlled to the reference acceleration "am" with high accuracy.

There is a difference in the response characteristics between the power train as an actuator used for controlling the actual acceleration to a desirable one, and the brake actuator 20. That is, the brake actuator 20 has higher response characteristics than the power train. The brake actuator 20 may be or may not be used for the feedback control of the acceleration. Setting a single feedback gain at the feedback controller 24B may make it difficult to properly perform the control. Also, the travel conditions of the vehicle where the power train is used are different from the travel conditions where the brake actuator 20 is used. Accordingly, requested control characteristics are also different between the case where the power train is used and the case where the brake actuator 20 is used. This will be explained below.

The power train is used when the vehicle is accelerated or is in steady travel. When the proportional gain "Kp" is excessively large, the proportional term will be excessively increased in respect of extremely small disturbance, and thus the controlled variable will be vibrational. Meanwhile, when the vehicle is in steady travel, the vibration in the controlled variable is desired to be suppressed as much as possible. Therefore, the proportional gain "Kp" for the time when the brake actuator 20 is not used, is desired not to be set to a large value. On the other hand, the brake actuator 20 is used when the vehicle is decelerated. In other words, it rarely happens that the brake actuator is used in steady travel. Thus, the proportional gain "Kp" for the time when the brake actuator 20 is used, is desired to be set to a large value to some extent, so that the braking force may be promptly generated. For these reasons, it is preferred that the proportional gain "Kp" is set larger for the time when the brake actuator 20 is used than for the time when not used.

The integral gain "Ki" is likely to cause the controlled variable to be more vibrational with lower response characteristics. Hereinafter, the vehicle response characteristics are represented by a primary delay model "1/Ts+1", and a description will be provided taking the case of performing PI (proportional-integral) control as an example.

In this case, a transfer function of an output "y" to an input "x" is expressed by the following formula:

$$y=(s \cdot Kp+Ki)x/\{T \cdot s \cdot s+(1+Kp)s+Ki\}$$

Thus, since the transfer function will have a secondary delay, a damping ratio "η" may be expressed as follows:

$$\eta=(1+Kp)/\{2\sqrt{(T/Ki)}\}$$

Having low response characteristics corresponds to having a large time constant "T". In this case, the damping ratio "η" will be large. In other words, the variation in the controlled variable will be large. Accordingly, irrespective of the response characteristics, the integral gain "Ki" is requested to be set to a smaller value as the response characteristics become lower, in order to suppress the vibration in the controlled variable.

As described above, the optimal gains will be different between the time when the actuator 20 is used and the time when not used. In this regard, in the present embodiment, the gains in the feedback control are differentiated between the time when the actuator 20 is used and the time when not used in performing the feedback control of acceleration. In this way, optimal gains can be set for each of the actuators to be used.

Figure 9:
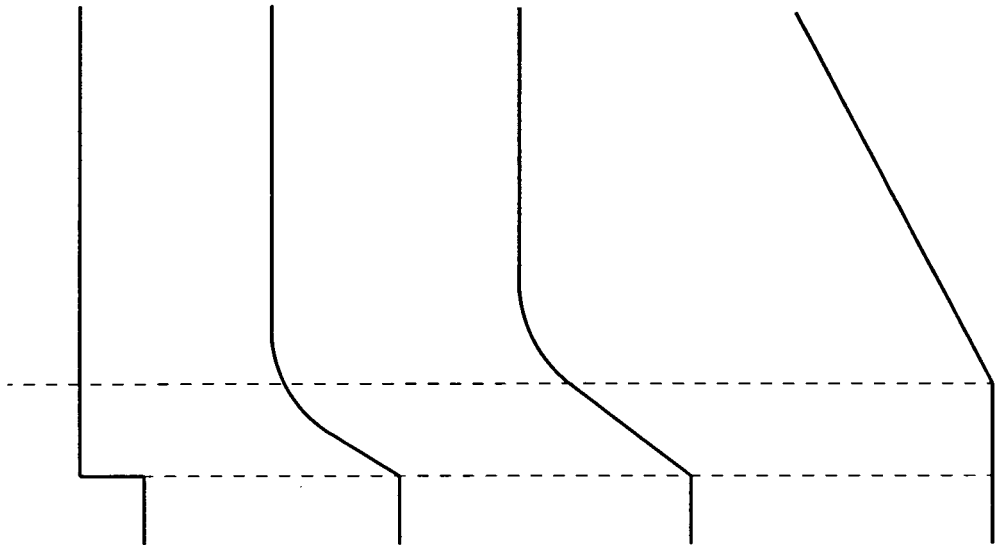
FIGS. 9A to 9D are time diagrams illustrating transition of hydraulic oil pressure in activating a brake actuator, according to the first embodiment.

However, as shown in FIGS. 9A to 9D, immediately after the activation of the brake actuator 20, the pressure of the hydraulic oil is not sufficiently raised, and thus the response characteristics are low. FIG. 9A shows start conditions of the motor furnished to the pump Po in the brake actuator 20. FIG. 9B shows the transition in the rotational speed of the motor. FIG. 9C shows the transition in the discharge amount of the pump. FIG. 9D shows the pressure of the hydraulic oil. As shown in the figures, a certain time is requested from when the motor is started up to the time when the rotational speed of the motor is raised. Accordingly, the discharge amount of the pump Po is raised with the increase in the rotational speed of the motor. When the rotational speed of the motor is low, the discharge amount of the pump Po is small. Accordingly, there is a delay from the point of starting the motor up to the point when the pressure of the hydraulic oil is raised.

The pressure rise of the hydraulic oil in each wheel cylinder 24 will allow the brake pad to be pressed against the rotor to thereby generate a braking force. However, it will take some time before the braking force is generated. Specifically, up to the point when the braking force is effected by the brake actuator 20, a clearance is usually present between the brake pad and the rotor. Therefore, even when the hydraulic oil is supplied into the wheel cylinder 20 from the brake actuator 20, there may be a response delay before the brake pad is brought into a state of being pressed against the rotor. Thus, at the beginning of the command for effecting the braking force, the braking force may be insufficient.

For this reason, no proper gains may be obtained at the beginning of the activation of the brake actuator 20, from the use of the feedback control gains which are suitable for the operation characteristics exerted after achieving sufficient braking force with the brake actuator 20. In particular, when the braking force of the brake actuator 20 is yet to be sufficient, the requested brake torque "Twbk" cannot be promptly realized. Accordingly, the actual acceleration "a" is deviated from the reference acceleration "am", by which the integral term may be increased. Under the circumstances, therefore, use of the control gains for the case of using the brake actuator 20, or use of large gains, may make the integral term excessively large.

In this regard, in the present embodiment, as a preparation to the use of the actuator 20, the start of use of the brake actuator 20 is estimated to start the motor prior to the use of the brake actuator 20. The details are provided below.

Figure 10:
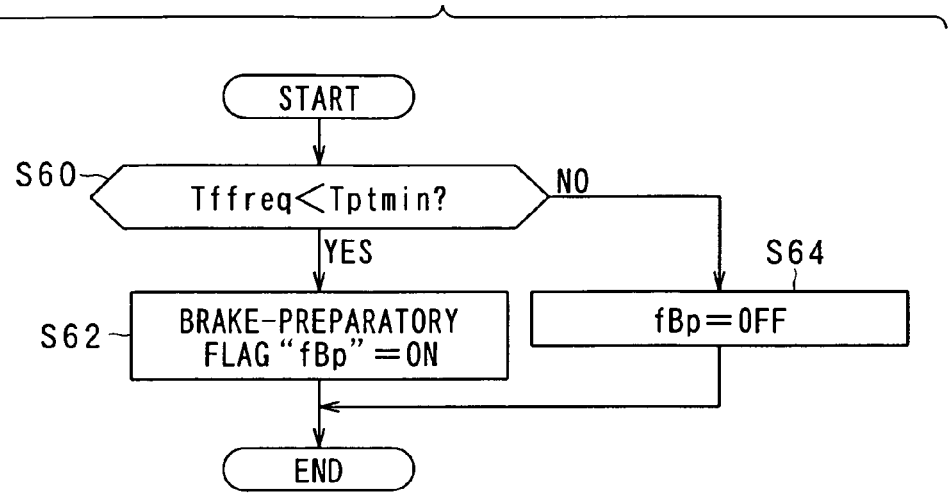
FIG. 10 is a flow diagram illustrating a procedure for estimating the start of use of the brake actuator, according to the first embodiment.

FIG. 10 illustrates a series of processes for estimating the start of use of the brake actuator 20. These processes are repeatedly performed by the control apparatus 30 at a predetermined time interval, for example.

First, at step S60, it is determined whether or not a requested torque "Tffreq" is smaller than a minimum torque "Tptmin". This process is purposed to estimate whether or not a request for starting use of the brake actuator 20 is issued. It should be appreciated that the requested torque "Tffreq" is a torque requested for the feedforward control for attaining the requested acceleration "ar". The requested torque "Tffreq" is calculated by assigning the requested acceleration "ar", instead of the jerk acceleration "aj", to the processes shown in FIG. 7, which processes are performed by the feedforward controller B26. Thus, when the requested torque "Tffreq" is smaller than the minimum torque "Tptmin", it is considered that the requested axle torque "Tw" becomes smaller than the minimum torque "Tptmin" during the period up to the subsequent calculation cycle of the requested acceleration "ar", whereby the request is issued for using the braking force of the brake actuator 20.

If an affirmative determination is made at step S60, control proceeds to step S62 where a brake-preparatory flag "fBp" is turned on to indicate that the braking control will be made ready with the activation of the pump Po of the brake actuator 20. On the other hand, if a negative determination is made at step S60, control proceeds to step S64 where the brake-preparatory flag "fBp" is turned off.

When the processes of steps S62 and S64 are finished, the series of processes are once ended.

Figure 11:
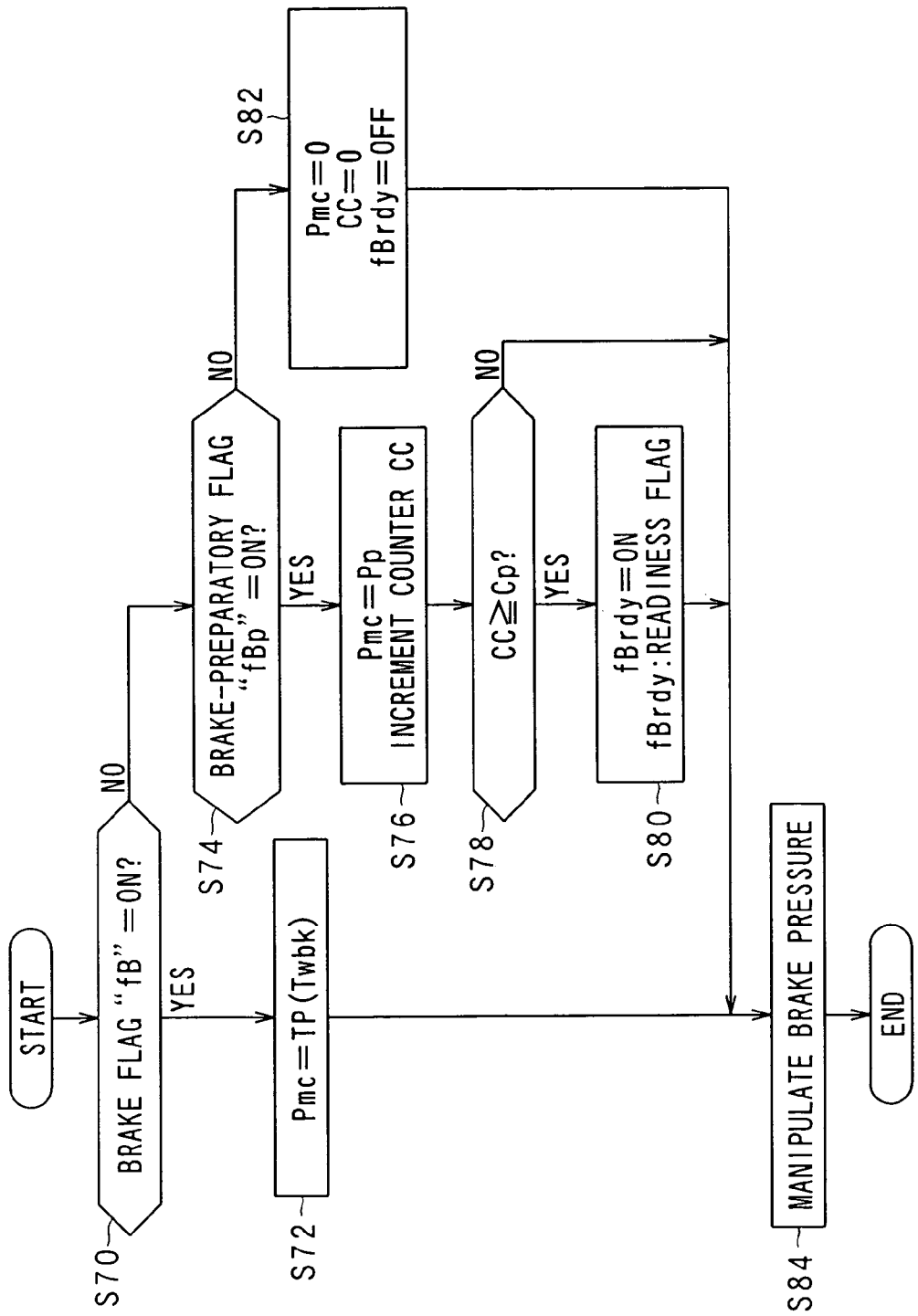
FIG. 11 is a flow diagram illustrating a procedure concerning the operation of the brake actuator, according to the first embodiment.

FIG. 11 shows a series of processes associated with the operation of the brake actuator 20. These processes are repeatedly performed by the control apparatus 30 at a predetermined time interval, for example.

First, at step S70, it is determined whether or not a brake flag "fB" so is turned on through the processes of FIG. 8, which are performed by the distributor B30. If the brake flag "fB" is in an on-state, control proceeds to step S72 where the brake pressure "Pmc" is set based on the requested brake torque "Twbk". Particularly, the map shown in FIG. 12 is used to perform a map calculation of the brake pressure "Pmc". As can be seen from the map, as the requested brake torque "Twbk" becomes larger, a larger value is set for the requested brake pressure "Pmc".

If a negative determination is made at step S70 of FIG. 11, control proceeds to step S74 where a determination is made as to whether or not the brake-preparatory flag "fBp" is in an on-state as a result of the processes of FIG. 10. This process is purposed to determine whether or not preparation should be made for the start of using the braking force of the brake actuator 20 by activating the pump Po of the brake actuator 20.

If an affirmative determination is made at step S74, control proceeds to step S76 where the requested brake pressure "Pmc" is set to a preparatory pressure "Pp", and at the same time, a counter CC is incremented. The preparatory pressure "Pp" is set to a value so that generation of the braking force can be promptly started by the brake actuator 20 when the requested brake torque "Twbk" will no longer be zero. The counter CC measures time since the preparatory pressure "Pc" has been set as the requested brake pressure "Pmc".

At the subsequent step S78, it is determined whether or not the counter CC has counted a readiness period "Cp" or more. This process is purposed to determine whether or not conditions are ready for the brake actuator 20 to promptly start generation of the braking force when the requested brake torque "Twbk" will no longer be zero. The readiness period "Cp" is set based on the time up to the point when such conditions are estimated to be ready from the start of the preparatory process. In this way, in the present embodiment, the determination on such conditions is made based on the elapsed time since the start of the preparatory process. This setting is purposed to enhance the accuracy of the determination, comparing with the case where the above determination is made based on a detection value of the pressure of the hydraulic oil in the brake actuator 20.

If an affirmative determination is made at step S78, control proceeds to step S80 where a readiness flag "fBrdy" is turned on to indicate that the braking force of the brake actuator 20 is ready for use. On the other hand, if a negative determination is made at step S74, control proceeds to step S82 where the requested brake pressure "Pmc" and the counter CC are initialized, and at the same time, the readiness flag "fBrdy" is turned off.

When the processes of steps S72, S80 and S82 are finished, as well as when a negative determination is made at step S78, control proceeds to step S84. At step S84, the brake pressure is manipulated based on the requested brake pressure "Pmc". This process is performed in the form of manipulating the pump Po of the brake actuator 20, and in the form of manipulating the linear relief valve Vf, the retention valve Vk and the decompression valve Vr. The process performed in an on-state of the brake-preparatory flag "fBp" may alternatively be a process of achieving a certain pressure in the wheel cylinder 24, by which the clearance between the brake pad and the rotor is eliminated to bring them into contact with each other. Alternatively, the process may be a process of causing in advance extremely small braking force. The extremely small braking force here may desirably have a value of a level that will not prevent the control for attaining the currently requested "ar", or in particular, may desirably have a value of a level that can ignore the change in the feedback manipulated variable "Tfb". When the process of step S84 is finished, the series of processes are once ended.

FIG. 13 shows a series of processes for switching gains in the feedback control, according to the present embodiment. These processes are repeatedly performed by the control apparatus 30 at a predetermined time interval, for example.

First, at step S90, it is determined whether or not the brake flag "fB" is in an on-state as a result of the processes shown in FIG. 8, which are performed by the distributor B30, and at the same time whether or not the readiness flag "fBrdy" is in an on-state as a result of the processes shown in FIG. 11. This process is purposed to determine whether the gains in the feedback control are to be set for the time when the brake actuator 20 is used, or for the time when not used. If an affirmative determination is made at step S90, control proceeds to S92 where the gains (proportional gain "Kpb", integral gain "Kib" and differential gain "Kdb") in the feedback control are set for the time when the brake actuator 20 is used, If a negative determination is made at step S90, control proceeds to step S94 where the gains (proportional gain "Kpp", integral gain "Kip" and differential gain "Kdp") in the feedback control are set for the time when the brake actuator 20 is not used.

In the present embodiment, the proportional gain "Kpb", the integral gain "Kib" and the differential gain "Kdb" for the time when the brake actuator 20 is used, are set larger than the proportional gain "Kpp", the integral gain "Kip" and the differential gain "Kdp" for the time when not used, respectively. When the processes of steps S92 and S94 are finished, the series of processes are once ended.

According to the present embodiment described in detail above, the following advantages can be obtained.

(1) The gains in the feedback control have been differentiated between the time when the brake actuator 20 is used for the feedback control, and the time when not used. Thus, feedback control can be performed with the gains suitable for the actuator used for generating the requested axle torque "Tw".

(2) The gains in the feedback control have been set to larger values for the time when the brake actuator 20 is sued for the feedback control, than for the time when not used. Thus, proper gains can be set for the time when the brake actuator 20 is used and when not used.

(3) When the request for using the braking force of the brake actuator 20 is estimated to be issued, the pump Po of the brake actuator 20 has been activated in advance. Thus, the responsiveness of the brake actuator 20 can be enhanced immediately after the timing when the requested brake torque "Twbk" will no longer be zero. In addition, sufficient braking force can be obtained immediately following the start of use of the braking force.

(4) An estimation has been made as to whether or not a request for using the braking force of the brake actuator 20 is issued. Thus, it is possible to estimate in advance whether or not the conditions can be attained, where use of the brake actuator 20 is desired, with the generation of the requested axle torque "Tw" which is calculated based on the jerk acceleration "aj".

Second Embodiment

With reference to the drawings, hereinafter will be described a second embodiment of the present invention, focusing on the differences from the first embodiment. In the present embodiment, the identical or similar components and steps to those in the first embodiment are given the same reference numerals for the sake of omitting explanation.

In the present embodiment, at the start of use of the brake actuator 20, switching of the gains in the feedback control is delayed. Thus, the gains can be prevented from becoming excessively large immediately after the start of use of the brake actuator 20, when braking force is insufficient.

Figure 14:
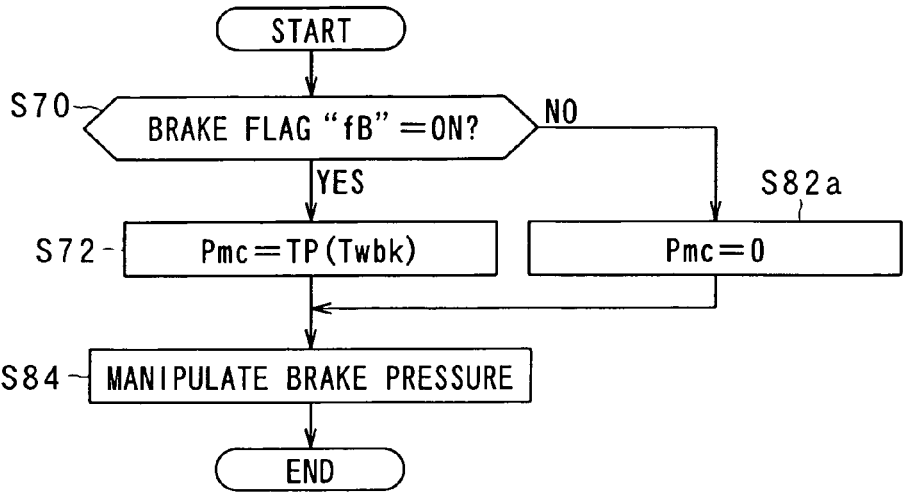
FIG. 14 is a flow diagram illustrating a procedure concerning the operation of a brake actuator, according to a second embodiment of the present invention.

FIG. 14 shows a series of processes associated with the manipulation of the brake actuator 20, according to the present embodiment. These processes are repeatedly performed by the control apparatus 30 at a predetermined time interval, for example.

As shown, in the present embodiment, when the brake flag "fB" is in an on-state, the brake actuator 20 is manipulated so as to have the requested brake pressure "Pmc" based on the requested brake torque "Twbk". However, no preparatory process is performed.

Figure 15:
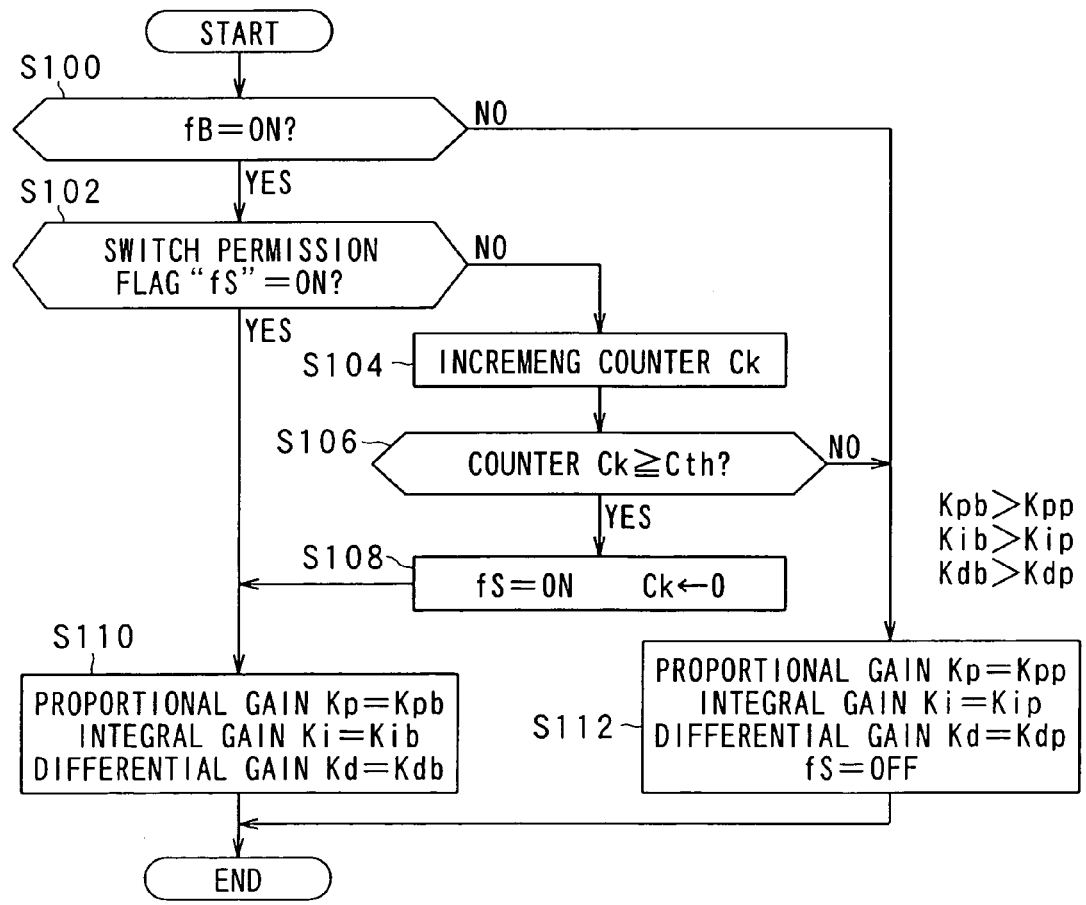
FIG. 15 is a flow diagram illustrating a procedure for switching gains in the feedback control, according to the second embodiment.

FIG. 15 shows a series of processes for switching the gains in the feedback control, according to the present embodiment. These processes are repeatedly performed by the control apparatus 30 at a predetermined time interval, for example.

First, at step S100, it is determined whether or not the brake flag "fB" is in an on-state. This process is purposed to determine whether or not the proportional gain "Kpb", the integral gain "Kib" and the differential gain "Kdb" for the time when the brake actuator 20 is in use, should be used as the gains in the feedback control. If an affirmative determination is made at step S100, control proceeds to step S102 where it is determined whether or not a switch permission flag "fS" is in an on-state for switching the gains to the proportional gain "Kpb", the integral gain "Kib" and the differential gain "Kdb" for the time when the brake actuator 20 is in use.

If a determination is made that the switch permission flag "fS" is not in an on-state, control proceeds to step S104 where a counter Ck is incremented to measure the time since the brake flag "fB" has been turned on. At the subsequent step S106, it is determined whether or not the counter Ck has counted a switching time "Cth" or more. The switching time "Cth" is set based on the time that is taken from when the brake flag "fB" has been turned on up to the point when the braking force generated by the brake actuator 20 is estimated to be sufficient. When it is determined that the switching time "Cth" or more has been counted, control proceeds to step S108 where the switch permission flag "fS" is turned on and the counter Ck is zeroed.

When the process of step S108 is finished and when an affirmative determination is made at step S102, control proceeds to step S110. At step S110, the gains in the feedback control are set to the proportional gain "Kpb", the integral gain "Kib" and the differential gain "Kdb" for the time when the brake actuator 20 is in use. On the other hand, when a negative determination is made at steps S100 and S106, control proceeds to step S112 where the gains in the feedback control are set to the proportional gain "Kpp", the integral gain "Kip" and the differential gain "Kdp" for the time when the brake actuator 20 is not in use. When the processes of steps S110 and S112 are finished, the series of processes are once ended.

According to the processes described above, the pump Po of the brake actuator 20 is activated when the brake flag "fB" is turned on. For this activation timing, the timing for switching the control gains is delayed. As a result, the integral term can be prevented from becoming excessively large when the braking force is insufficient.

The following advantage can be obtained from the present embodiment described above, in addition to the advantages (1) and (2) of the first embodiment.

(5) The switching of the gains in the feedback control has been delayed, for the timing when a request is issued for using the braking force of the brake actuator 20. Thus, when the braking force is insufficient, the feedback control can be carried out using the gains for the time when the brake actuator 20 is not used, that is, using the gains smaller than those for the time when the brake actuator 20 is used. Further, under the circumstances where the braking force is insufficient, feedback control can be performed with proper gains.

(Modifications)

The embodiments described above may be modified as follows.

In the first embodiment, whether or not the brake actuator 20 is ready (whether or not the readiness flag "fBrdy" should be turned on) has been determined in terms of the time from the start of the preparation. However, the determination may not necessarily be made in this way. For example, a determination may be made based on detection values, such as of the pressure of the hydraulic oil in the brake actuator 20 or of the rotational speed of the motor furnished to the pump Po.

In the second embodiment, the switch timing of all of the proportional gain "Kp", the integral gain "Ki" and the differential gain "Kd" has been delayed, with respect to the timing when a request is issued for using the braking force of the brake actuator 20, for the control of the acceleration. Alternative to this, by delaying only the switch timing of the integral gain "Ki", for example, the increase in the integral term can be suppressed, which increase is ascribed to the delay in the pressure rise of the hydraulic oil, or the response delay of the braking force caused by the clearance between the brake pad and the rotor. Also, in the second embodiment, the proportional gain "Kp", the integral gain "Ki" and the differential gain "Kd" have been set to the gains (Kpp, Kip, Kdp) for the time when the brake actuator 20 is not in use, prior to setting these gains to the gains (Kpb, Kib, Kdb) for the time when the brake actuator 20 is in use. Alternative to this, the gains may temporarily be switched to dedicated gains which are smaller than the gains (Kpb, Kib, Kdb) for the time when the brake actuator 20 is in use. This may also suppress the increase of the integral term, which increase is ascribed to the delay in the pressure rise of the hydraulic oil, or the response delay of the braking force caused by the clearance between the brake pad and the rotor.

In the embodiment described above, the reference model has been set based on the response characteristics at the time when the response delay of the actual acceleration is maximized with respect to the step change of the target acceleration. Alternatively, for example, the reference model may be variably set according to the response characteristics for every operating condition of the vehicle. Also, the reference model is not limited to the primary delay mode, but may, for example, be a secondary delay model.

The parameter for changing the proportional gain "Kp", the integral gain "Ki" and the differential gain "Kd" is not limited to the brake flag "fB". For example, the gains may be variably set according to a difference "Δ" between the actual acceleration "a" and the reference acceleration "am". In this case, the integral term, for example, will be a time Integral value expressed by "i(Δ)×Δ".

The feedback controller B24 is not limited to the one that performs PID (proportional-integral-differential) control, but may be the one that performs either one of or any two of P control, I control and D control. Alternatively, modern control may be used instead of classical control.

The feedforward controller B26 is not limited to the one that performs the processes described above. The feedforward controller B26 may calculate the feedforward manipulated variable "Tff" only from the reference force "Maj", for example, Also, the feedforward manipulated variable "Tff" may be calculated using either one of or any two of the air resistance, the road surface resistance and the gravity. However, In the case where such a modification is made in the second embodiment, the requested torque "Tffreq" may be ensured to be calculated in the calculation process of the feedforward manipulated variable "Tff" by replacing the jerk acceleration "aj" with the requested acceleration "ar".

In the embodiment described above, two-degree freedom control has been performed. However, alternative to this, only feedback control, such as PID control, may be performed.

In the embodiment described above, the model follow-up control has been performed. Alternative to this, the reference model setter B14 may be omitted.

In the acceleration control in the embodiment described above, the means for imparting positive torque to the vehicle (more particularly the drive wheels 16 of the vehicle) has been exemplified by the power train, i.e. motive power generation apparatus, including the engine 10 and the automatic transmission apparatus 14. Alternatively, however, a motor may be used, for example, as the motive power generation apparatus. Also, the automatic transmission apparatus 14 may not necessarily be the one having a planetary gear automatic transmission, but may, for example, be the one having a continuously variable transmission (CVT) which is able to adjust the gear ratio in a continuous manner.

In the acceleration control in the embodiment described above, the means for imparting negative torque to the vehicle (more particularly the drive wheels 16 of the vehicle) has been exemplified by the hydraulic brake actuator. Alternatively, however, a generator may be used, for example, which converts the torque of wheels (drive wheels 16 and the idler wheels 18) into electric energy.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be is embraced by the claims.

What is claimed is:

1. A control apparatus for controlling acceleration of a vehicle provided with a motive power generation apparatus and brake apparatuses, comprising:
    calculation means for calculating an amount of torque to be requested, for feedback control of an actual value of the acceleration of the vehicle to a target value of the acceleration based on a difference between the actual value of the acceleration and the target value and a gain for the feedback control,
    wherein the calculation means comprises
    determining means for determining whether or not the brake apparatuses are used in performing the feedback control; and
    changing means for changing the value of the gain to be different from each other between a first case in which the determining means determines that the brake apparatuses are used when performing the feedback control and a second case in which the determining means determines that the brake apparatuses are not used when performing the feedback control;
    distribution means for distributing the calculated amount of torque to an amount of torque necessary for the motive power generation apparatus and an amount of torque necessary for the brake apparatuses; and
    actuating means for actuating the motive power generation apparatus and the brake apparatuses based on the calculated and distributed amounts of torque.

2. The control apparatus of claim 1, wherein the value of the gain in the first case is made larger than the value of the gain in the second case.

3. The control apparatus of claim 2, wherein the motive power generation apparatus comprises an internal combustion engine and a transmission apparatus coupled to the engine, which are mounted on the vehicle.

4. The control apparatus of claim 2, wherein the brake apparatuses are fluid-driven brake apparatuses that generate a braking force based on pressure of operating fluid contained therein,
    the calculation means comprises
    estimating means for estimating the occurrence of a predetermined condition where the braking force generated by the brake apparatuses is insufficient from a target value thereof, and
    reduction means for reducing the gain for the feedback control from the value of the gain preset in the first case, when the estimating means estimates the predetermined condition.

5. The control apparatus of claim 2, wherein the brake apparatuses are fluid-driven brake apparatuses that generate a braking force based on pressure of operating fluid contained therein,
    the calculation means comprises
    estimating means for estimating the occurrence of a predetermined condition where (i) the distributed requested torque for the brake apparatuses is not zero so that there is still a demand for the braking force and (ii) the braking force generated by the brake apparatuses is insufficient from a target value thereof, and
    delay means for delaying the change of the gain.

6. The control apparatus of claim 5, wherein
    the calculation means is configured to calculate the amount of torque to be requested, based on an accumulated amount of a value indicative of the difference between the actual value of the acceleration to the target value thereof, and
    the delay means is configured to delay the change of the gain using the accumulated amount of the value indicative of the difference.

7. The control apparatus of claim 2, wherein the brake apparatuses are fluid-driven brake apparatuses that generate a braking force based on pressure of operating fluid contained therein,
    the calculation means comprises
    determination means for determining whether or not a request for using the braking force of the brake apparatuses will issue; and
    increase means for previously increasing the pressure of the operating fluid to be generated by the brake apparatuses when it is determined by the determination means that the request for using the braking force will issue.

8. The control apparatus of claim 7, comprising
    acceleration calculating means for calculating acceleration to be requested by the vehicle at first intervals, and
    target acceleration calculating means for calculating the value of the target acceleration by gradually changing the target acceleration to the calculated acceleration to be requested, at second intervals shorter than the first intervals, wherein the determination means is configured to use the requested acceleration in the determination.

9. A control apparatus for controlling acceleration of a vehicle, comprising:

a motive power generation apparatus mounted on the vehicle;

brake apparatuses mounted on the vehicle;

calculation means for calculating an amount of torque to be requested, for feedback controlling an actual value of the acceleration of the vehicle to a target value of the acceleration based on a difference between the actual value of the acceleration and the target value and a gain for the feedback control, wherein the calculation means comprises determining means for determining whether or not the brake apparatuses are used when performing the feedback control; and changing means for changing the value of the gain to be different from each other between a first case in which the determining means determines the brake apparatuses are used when performing the feedback control and a second case in which the determining means determines that the brake apparatuses are not used when performing the feedback control;

distribution means for distributing the calculated amount of torque to an amount of torque necessary for the motive power generation apparatus and an amount of torque necessary for the brake apparatuses; and actuating means for actuating the motive power generation apparatus and the brake apparatuses based on the calculated and distributed amounts of torque.

10. The control apparatus of claim 9, wherein the value of the gain in the first case is made larger than the value of the gain in the second case.

* * * * *